United States Patent Office 3,551,307
Patented Dec. 29, 1970

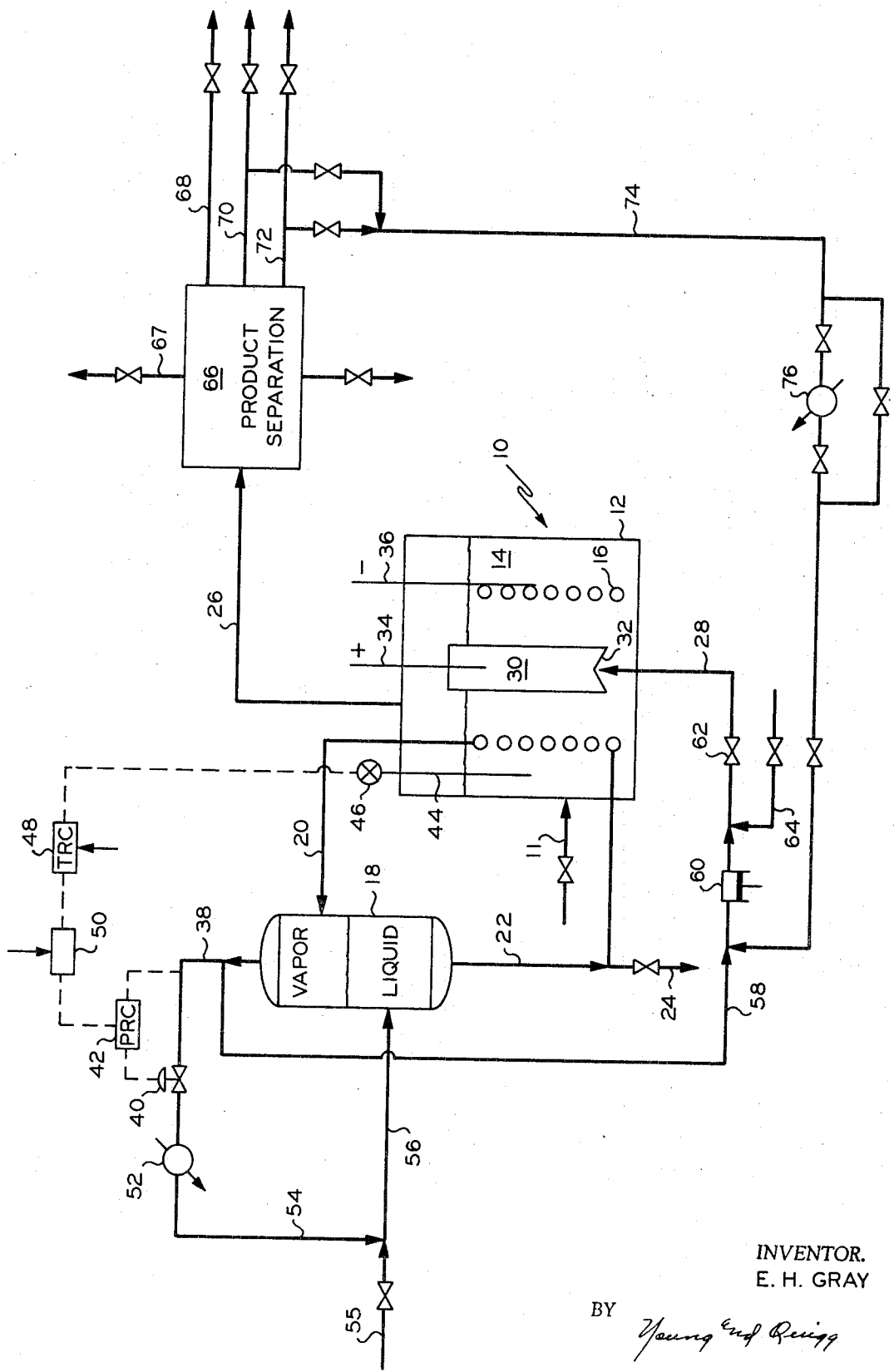

3,551,307
TEMPERATURE CONTROL IN ELECTRO-CHEMICAL CONVERSION PROCESSES
Earl H. Gray, Bartlesville, Okla., assignor to Phillips Petroleum Company, a corporation of Delaware
Filed Sept. 18, 1968, Ser. No. 760,582
Int. Cl. B01k 3/00
U.S. Cl. 204—59                                    12 Claims

ABSTRACT OF THE DISCLOSURE

Temperature control in an electrochemical conversion process is maintained by using process feedstock as a coolant medium for the electrolyte in the electrolytic cell. Said coolant is passed into indirect heat exchange with said electrolyte. At least a portion of said coolant is permitted to vaporize during said heat exchange so as to remove heat from said electrolyte, and at least a portion of said vaporized coolant is passed into the cell as feedstock. A combination of apparatus is provided for determining the temperature of said electrolyte and controlling the pressure on the heat exchange means in accordance with said determined temperature.

---

This invention relates to electrochemical conversion. In one aspect the invention relates to a method for controlling temperature in an electrochemical conversion process. In another aspect the invention relates to apparatus for controlling the temperature in an electrochemical conversion process.

Electrochemical conversion processes for converting a wide variety of feedstocks to desirable products are well known in the art. These processes include processes described as anode processes, e.g., processes wherein the desired reaction is carried out at or in the region of the anode, and also processes described as cathode processes, e.g., processes wherein the desired reaction is carried out at or in the region of the cathode. In many electrochemical conversion processes it is often desirable to maintain the electrolyte temperature at a desired value or at least within a narrow range of temperature. This sometimes becomes quite difficult due to $I^2R$ losses within the electrolyte, coupled with the unavoidable heat of reaction. It is known to cool electrolytic cells by circulating various coolants in coils or tubes disposed within the cell. However, the most convenient coolant, water, frequently reacts violently with the electrolyte when leakage of the coolant occurs. In many cells there is also the danger of contaminating the products of the process with the coolant or with products of the reaction between the coolant and the electrolyte. Leakage of cooling water into the electrolyte is not an uncommon occurrence in view of the thin-walled cooling tubes employed and the corrosiveness of some cooling waters and some electrolytes.

The present invention provides a method and apparatus for controlling temperature in an electrochemical conversion process which eliminates or at least mitigates the above-described difficulties. Broadly speaking, the method of the invention comprises passing as coolant a stream of the feedstock which is to be converted into indirect heat exchange relationship with the electrolyte. At least a portion of said coolant stream of feedstock is permitted to vaporize during said heat exchange. If desired, at least a portion of the resultant coolant vapors can then be passed as feedstock into the cell for conversion.

An object of this invention is to provide an improved electrochemical conversion process. Another object of this invention is to provide a method for controlling the temperature in an electrochemical conversion process. Another object of this invention is to provide an apparatus for controlling the temperature in an electrochemical conversion process. Another object of the invention is to provide a method and an apparatus for cooling an electrolytic cell wherein any leakage between coolant and electrolyte will be substantially innocuous. Other aspects, objects, and advantages of the invention will be apparent to those skilled in the art in view of this disclosure.

Thus, according to the invention, there is provided a process for the electrochemical conversion of a feedstock at an electrode disposed in an electrolyte in an electrolytic cell, which process comprises: passing a coolant stream of said feedstock into indirect heat exchange relationship with said electrolyte; permitting at least a portion of said coolant stream of feedstock to vaporize during said heat exchange; and passing at least a portion of the resultant feedstock vapors into contact with said electrode.

Further according to the invention, there is provided electrochemical conversion apparatus comprising, in combination: an electrolytic cell; a body of electrolyte disposed in said cell; heat exchange means disposed in said electrolyte; a vapor-liquid separator; first conduit means connecting said heat exchange means and said separator for passing a stream comprising vapors from said heat exchange means to said separator; second conduit means for passing liquid from said separator to said cell; third conduit means for withdrawing cell products from said cell; fourth conduit means for introducing a feedstock to said cell; fifth conduit means for withdrawing vapor from said separator; pressure control means disposed in said fifth conduit means for controlling the pressure in said separator; temperature sensing means for determining the temperature of said electrolyte; and temperature control means and said temperature sensing means for actuating said pressure control means responsive to the temperature of said electrolyte.

A number of advantages are realized or obtained in the practice of the invention. The coolant-feedstock material used in the heat exchange means disposed in the electrolytic cell is compatible with the reaction system. Leaks of the coolant-feedstock into the electrolyte do not react with the electrolyte as water does with many electrolytes. Similarly, leaks of the coolant-feedstock into the reaction products of the cell will not create any complicated separation of purification problems. The method of the invention can be employed to provide close temperature control which makes possible increased uniformity in operation of the conversion process. Another advantage of the invention is that at least a portion of the heat from the cell is recovered and utilized in vaporizing the feedstock.

The invention is applicable to any electrochemical conversion process wherein it is desired to remove heat of reaction from the system and wherein the feedstock is essentially vaporized at cell operating conidtions. The invention is particularly applicable to those processes and systems wherein close temperature control within a narrow range is desirable. In the practice of the invention the pressure within the heat exchange means disposed in the cell is controlled so that the feedstock therein boils at or slightly below the desired cell operating temperature. If the normal boiling point of the feedstock is too low, the pressure in said heat exchange means can be increased as desired. If the normal boiling point of the feedstock is too high, the pressure in said heat exchange means can be lowered as desired. Thus, the invention is applicable to processes utilizing a wide variety of feedstocks. The only limitation is that the critical temperature of the feedstock must be higher than the desired cell operating temperature. Preferably, said critical temperature will be at least several degrees, e.g., at least 5° C. higher than said cell operating temperature. More preferably, said critical temperature will be within the range of from 50 to 300° C. higher than said desired cell operating temperature. Actual operating conditions within a typical electrolytic cell depend largely upon cell design and consideration of thermodynamic and economic factors for the particular conversion process being utilized. Consequently, said operating conditions can vary widely depending upon the particular conversion process.

As indicated, the invention is applicable to a wide variety of electrochemical conversion processes. The invention is particularly applicable to electrochemical conversion processes in which porous electrodes can be employed and the feedsock is introduced into the pores of an electrode in essentially vapor phase. Some examples of such processes are electrochemical halogenation, electrochemical cyanation, and cathodic conversions such as the reduction of alcohols to hydrocarbons, the reduction of organic ozonolysis products, or the reduction of organic acids to alcohols. One electrochemical conversion process in which the invention is particularly valuable is the electrochemical fluorination of fluorinatable materials in the presence of an essentially anhydrous liquid hydrogen fluoride-containing electrolyte. Thus, for purposes of convenience, and not by way of limitation, the invention will be further described in terms of being employed in the electrochemical fluorination of fluorinatable materials when using said hydrogen fluoride-containing electrolyte.

Various processes for carrying out electrochemical fluorination reactions are known. In one presently preferred process a current-conducting, essentially anhydrous liquid hydrogen fluoride electrolyte is electrolyzed in an electrolysis cell provided with a cathode and a porous anode (preferably porous carbon), a fluorinatable feedstock is introduced into the pores of said anode and at least a portion of said feedstock is at least partially fluorinated within the pores of said anode, and fluorinated products are recovered from the cell.

Very few organic compounds are resistant to fluorination. Consequently, a wide variety of feed materials, both normally liquid and normally gaseous compounds, can be used as feedstocks in said process. Organic compounds which are normally gaseous or which can be introduced in gaseous state into the pores of a porous anode under the conditions employed in the electrolysis cell, and which are capable of reacting with fluorine, are presently preferred as starting materials. Generally speaking, desirable organic starting materials which can be used are those containing from 2 to 8, preferably 2 to 6, carbon atoms per molecule. However, reactants which contain more than 6 or 8 carbon atoms can also be used. Some general types of organic starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. The presently more preferred starting materials are the normally gaseous organic compounds, and particularly the saturated and unsaturated hydrocarbons, containing from 2 to 4 carbon atoms per molecule. Normally liquid feedstocks which can be vaporized under cell operating conditions are also preferred starting materials.

Since fluorine is so reactive, no list of practical length could include all starting materials which can be used. However, representative examples of the above-described starting materials include, among others, the following: propane; butane; isobutane; pentane; n-hexane; n-octane; cyclopropane; cyclopentane cyclohexane cyclooctane; 1,2-dichloroethane; 1-fluoro-2-chloro-3-methylheptane; propylene; cyclobutene; cyclohexene; 2-methylpentene-1; 2,3-dimethylhexene-2; butadiene; vinyl chloride; 3-fluoropropylene methylacetylene; vinylacetylene; 3,3-dimethylpentyne-2; allyl chloride; ethylamine; diethylamine; 2-amino - 3 - ethylpentane; 3-bromopropylamine; triethylamine; dimethyl ether; diethyl ether; methyl ethyl ether; methyl vinyl ether; 2-iodoethyl methyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2 - methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylenebromohydrin; benzene; toluene; cumene; o-xylene; p-xylene; and monochlorobenzene.

Although the hydrogen fluoride electrolyte can contain small amounts of water, such as up to about 5 weight percent, it is preferred that said electrolyte be essentially anhydrous. Generally speaking, it is preferred that said electrolyte contain not more than about 0.1 weight percent water. However, commercial anhydrous liquid hydrogen fluoride which normally contains dissolved water in amounts ranging from a trace (less than 0.1 weight percent) up to about 1 percent by weight can be used. Thus, as used herein and in the claims, the term "essentially anhydrous liquid hydrogen fluoride," unless otherwise specified, includes liquid hydrogen fluoride which can contain water not exceeding up to about 1 weight percent. As the electrolysis reaction proceeds, any water contained in the hydrogen fluoride electrolyte is slowly decomposed and said electrolyte concomitantly approaches the anhydrous state. The hydrogen fluoride electrolyte is consumed in the reaction and must be either continuously or intermittently replaced in the cell.

Pure anhydrous liquid hydrogen fluoride is nonconductive. The essentially anhydrous liquid hydrogen fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulfuric acid and phosphoric acid. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas $KF \cdot 2HF$, $KF \cdot 3HF$, or $KF \cdot 4HF$. In general, said additives are not consumed in the process and can be used indefinitely. Said additives are frequently referred to as conductivity additives for convenience.

The cell body and the electrodes in the cell must be fabricated of materials which are resistant to the action of the contents of the cell under the reaction conditions. Materials such as steel, iron, nickel, polytetrafluoroethylene (Teflon), carbon, and the like, can be employed for the cell body. The cathode can be fabricated in any suitable shape or design and can be made of any suitable conducting material such as iron, steel, nickel, alloys of said metals, and carbon. The anode preferably will comprise a porous element. Said anode can be fabricated from any suitable conducting material which is compatible with the system, e.g., nickel, iron, various metal alloys, and carbon, which is not wetted by the electrolyte. By "not wetted" is meant that the contact angle between the electrolyte and the anode must exceed 90° in order that anticapillary forces will prevent substantial invasion of the small pores of the anode by the electrolyte. Porous carbon, which is economical and readily available in ordinary channels of commerce, is presently preferred for the porous element of said anode. Porous carbon impregnated with a suitable metal such as nickel can also be used as the anode. Various grades of porous carbon can be used in the practice of the invention. It is preferred to employ porous carbon which has been made from carbon produced by pyrolysis, and not graphitic carbon. Two types of commercially available porous carbon are those known commercially as Stackpole 139 and National Carbon Grade 60. Said Stackpole 139 carbon has a pore volume of about 0.2 to about 0.3 cc. per gram with the pore diameters ranging from 0.1 to 10 microns in diameter. Said National Carbon Grade 60 has a pore volume of about 0.3 to about 0.5 cc. per gram with the pore diameters ranging from 10 to 60 microns in diameter. The actual values of said pore volumes will depend upon the specific method employed for determining same. Thus, preferred porous carbons for fabricating the preferred anodes include those having a pore volume within the range of about 0.2 to about 0.5 cc. per gram with the pores ranging from 0.1 to 60 microns in diameter.

As indicated above the invention is also applicable to cathodic conversion processes, i.e., processes wherein the electrochemical conversion process is carried out at or in the region of the cathode. In such processes, a porous cathode can be employed and the feedstock introduced into the pores of the cathode for conversion therein. Thus, while the invention is being describer herein primarily in terms of an electrochemical fluorination process which utilizes a porous anode, the statements herein with respect to porous anodes and their utilization can also be applied to porous cathodes.

Said anode or said cathode can be fabricated in any suitable shape or design, but must be arranged or provided with a suitable means for introducing the feed reactant material into the pores of the porous element thereof.

Except as described above, any convenient cell configuration or electrode arrangement can be employed. The cell must be provided with a vent or vents through which by-product hydrogen can escape and through which volatile cell products can be removed and recovered. If desired, or necessary, a drain can be provided on the bottom of the cell to facilitate removal of nongaseous cell products and/or electrolyte as desired. The cell may contain an ion permeable membrane or divider for dividing the cell into an anode compartment and a cathode compartment. It is sometimes desirable to employ such a divider to prevent hydrogen generated at the cathode from mixing and possibly reacting with anode products. Any conventionally known resistant divider material can be employed for this purpose. When the anode products are wtihdrawn from the cell through a conduit means directly connected to the anode, said divider can be omitted.

The electrochemical fluorination can be effectively and conveniently carried out over a broad range of temperatures and pressures limited only by the freezing point and the vapor pressure of the electrolyte. Generally speaking, the fluorination process can be carried out at temperatures within the range of from minus 80 to 500° C. at which the vapor pressure of the electrolyte is not excessive, e.g., less than 250 mm. Hg. It is preferred to operate at temperatures such that the vapor pressure of the electrolyte is less than about 50 mm. Hg. A presently preferred range of temperature is from about 60 to about 120° C.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process is conveniently carried out at substantially atmospheric pressure.

The rate of direct current flow through the cell is maintained at a rate which will give the highest practical current densities for the electrodes employed. Current densities within the range of from 30 to 1000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is normally employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum normal voltage will not exceed 20 volts per unit cell. Thus, as a guide, voltages in the range of 4 to 20 volts per unit cell are normally used. The term "anode geometric surface" refers to the outer geometric surface area of the porous carbon element of the anode which is exposed to electrolyte and does not include the pore surfaces of said porous element.

The feed rate of the fluorinatable feedstock being introduced into the pores of the porous carbon element of the anode is an important process variable in that, for a given current flow or current density, the feed rate controls the degree of conversion. Similarly, for a given feed rate, the amount of current flow or current density can be employed to control the degree of conversion. Feed rates which can be employed will preferably be in the range of from 0.5 to 10 milliliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow).

The actual feed rate employed will depend upon the type of porous material, e.g., porous carbon, used in fabricating the porous element of the anode as well as several other factors including the nature of the feedstock, the conversion desired, current density, etc., because all these factors are interrelated and a change in one will affect the others. The feed rate will be such that the feedstock is passed into the pores of the anode, and into contact with the fluorinating species therein, at a flow rate such that the inlet pressure of said feedstock into said pores is essentially less than the sum of (a) the hydrostatic pressure of the electrolyte at the level of entry of the feedstock into said pores and (b) the exit pressure of any unreacted feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these preferred flow rate conditions, there is established a pressure balance between the feedstock entering the pores of the anode from one direction and electrolyte attempting to enter the pores from another and opposing direction. This pressure balance provides an important and distinguishing feature in that essentially none of the feed leaves the anode to form bubbles which escape into the main body of the electrolyte. Essentially all of the feedstock travels within the carbon anode via the pores therein until it reaches a collection zone within the anode from which it is removed via a conduit, or until it extis from the anode at a point above the surface of the electrolyte.

The more permeable carbons will permit higher flow rates than the less permeable carbons. Any suitable porous carbon which will permit operation within the limits of the above-described pressure balance can be employed in fabricating the porous element of the anode. Thus, broadly speaking, porous carbons having a permeability within the range of from 0.5 to 75 darcys and average pore diameters within the range of from 1 to 150 microns can be employed. Generally speaking, carbons having a permeability within the range of from about 2 to about 30 darcys and an average pore diameter within the range of from about 20 to about 75 microns are more preferred.

Similarly, anode shapes, anode dimensions, and manner of disposal of the anode in the electrolyte will also have a bearing on the flow rate. Thus, owing to the many different types of carbon which can be employed and the almost infinite number of combinations of anode shapes, dimensions, and methods of disposal of the anode in the electrolyte, there are no really fixed numeral limits on the flow rates which can be used. Broadly speaking, the upper limit on the flow rate will be that at which "breakout" of feedstock and/or fluorinated product begins along the immersed portion of the anode. Herein and in the claims, unless otherwise specified "breakout" is defined as the formation of bubbles of feedstock and/or fluorinated product on the outer immersed surface of the anode with subsequent detachment of said bubbles wherein they pass into the main body of the electrolyte. Broadly speaking, the lower limit of the feed rate will be determined by the requirement to supply the minimum amount of feedstock sufficient to prevent evolution of free fluorine. As a practical guide to those skilled in the art, the feed rates can be within the range of from 3 to 600, preferably 12 to 240, cc. per minute per square centimeter of cross-sectional area (taken perpendicular to the direction of flow).

The above-described pressure balance will permit some invasion of the pores of the anode by the hydrogen fluoride electrolyte. The amount of said invasion will depend upon the inlet pressure of the feedstock and the pore size. The larger size pores are more readily invaded. It has been found that porous carbon anodes as described herein can be sucessfully operated when up to 40 to 50 percent of the pores have been invaded by liquid HF electrolyte.

The feed material and the products obtained therefrom are retained in the cell for a period of time which is generally less than one minute. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be pyrolyzed to recover hydrogen fluoride which can be returned to the cell, if desired. By-product hydrogen can be burned to provide heat energy or can be utilized in hydrogen-consuming processes such as hydrogenation, etc.

The drawing is a diagrammatic flow sheet illustrating various process steps and combinations of apparatus which can be employed in the practice of the invention.

Referring now to the drawing, the invention will be more fully explained. It will be understood that said drawing is diagrammatic and many items of equipment, e.g., valves, pumps, control apparatus, etc., not necessary for explanation of the invention, have been omitted for the sake of brevity. In said drawing there is illustrated an electrolytic cell designated generally by the reference numeral 10. Said cell comprises a container 12 which can be any type of container suitable for containing the electrolyte 14 and adapted for carrying out the process in question. A conduit 11 is provided to supply fresh or recycle electrolyte to cell 10 so as to maintain the electrolyte body 14 at the desired level. A heat exchange means 16, here shown to be a continuous helical coil or tube, is disposed within the body of said electrolyte 14. Said heat exchange means may be finned or not, may comprise a plurality of return bends, or may comprise a plurality of coils or tubes in parallel or series arrangements, or any other suitable form of indirect heat exchange means constructed so as to afford a relatively high surface area. A vapor-liquid separator 18 is disposed adjacent said cell 10. A first conduit means 20 is connected to the outlet of said heat exchange means 16 and to said vapor-liquid separator 18 for passing coolant vapor or mixed liquid and vapor from said heat exchange means to said separator. A second conduit means 22 is connected to said vapor-liquid separator and to the inlet of said heat exchange means 16 for passing liquid from said separator to said heat exchange means. If desired, drain conduit 24 can be provided for withdrawing any excess liquid from separator 18. A third conduit means 26 is provided for withdrawing cell products from said cell. A fourth conduit means 28 is provided for introducing a feedstock into said cell.

As here illustrated, there is disposed in said cell a porous electrode 30 which is preferably comprised of a porous material, such as porous carbon. Said electrode can be fabricated in any desired shape, e.g., rectangular, cylindrical, or other suitable shape. As here illustrated, feedstock inlet conduit 28 discharges into a cavity 32 provided in the bottom of said electrode. Said electrode 30 is provided with a suitable current collector 34 operatively connected to the electrode and to a source of electric current. As here illustrated, said electrode 30 is connected to be operated as an anode. As here illustrated, said heat exchange means 16 also serves as the cathode for the cell and is connected by means of cathode lead 36 to said source of electric current. If desired, a separate cathode fabricated from any suitable material can be employed in the cell separately from said heat exchange means. It will be understood by those skilled in the art that when it is desired to carry out a cathode process employing a porous cathode, said electrode 30 can be connected to operate as a cathode and said heat exchange means 16, or other suitable means, can be connected to the electric current to operate as an anode.

A fifth conduit means 38 is provided for withdrawing vapors from said separator 18. A pressure control valve 40 is disposed in said conduit 38, and together with pressure recorder controller 42, provides means for controlling the pressure in said separator 18. Temperature sensing means 44 extends into said electrolyte 1 for sensing the temperature thereof, and is connected to transmitter 46 which transmits a signal to temperature recorder-controller 48. Said TRC 48 can be connected directly to PRC 42 to provide the setpoint thereto so that TRC 48 directly controls PRC 42. However, it is preferred to transmit the signal from TRC 48 through a high pressure selective relay 50 which will limit the signal transmitted to PRC 42 and prevent the pressure in separator 18 from becoming too low. Said instrument 50 is a well known commercially available instrument. For example, Taylor Instrument Co. Model No. SK11359 can be employed.

A condenser 52 is also disposed in said conduit means 38, downstream from valve 40, for condensing vapors. Conduit 54 is provided for passing condensed vapors into conduit 56 for return of liquid to separator 18. Said conduit 56 can also be employed for introducing fresh liquid feedstock from conduit 55 into the ssytem. A sixth conduit means 58 is provided for passing another portion of the vapor from said separator 18 into said feedstock inlet conduit means 28. A compressor 60 is provided in said conduit means 58. If desired, a heat exchange means can be provided in the conduit downstream from compressor 60 for controlling the temperature of the effluent from said compressor. A flow control means 62 is provided in feedstock inlet conduit 28 for controlling the introduction of feedstock vapors into the cell. Said flow control means can be any suitable type of regulatory means such as a valve, a sized orifice, a flow recorder-controller or other suitable means known in the art. If desired, conduit 64 can be any suitable type of regulatory means such as a conduit 28 in addition to, or instead of, the vapors received from conduit 58 and compressor 60.

A product separation means 66 is provided adjacent said cell 10 and receives cell products via conduit 26. Said separation means can comprise any suitable means such as fractional distillation, fractional crystallization, etc., for separating the cell products. Hydrogen can be withdrawn via conduit 67. Converted products can be withdrawn via conduit 68, partially converted products can be withdrawn via conduit 70, and unconverted feedstock can be withdrawn via conduit 72. As shown, partially converted and/or unconverted feedstock can be passed by means of the manifolding arrangements shown and conduit 74 into conduit 58 for recycle to the process. Heat exchange means 76 can be disposed in conduit 74 for heating or cooling, as desired, the material being recycled via conduit 74.

In one presently preferred method of operation, an essentially vaporous feedstock is introduced via conduit 64 for initiating operation of the process and is passed via conduit 28 into the pores of electrode 30. Said feedstock passes upwardly through electrode 30 within the pores thereof, is at least partially converted, and conversion products together with any unconverted feedstock exit from the electrode into the space within the cell above said electrode. Cell products are withdrawn via conduit 26 and passed into product separation zone 66. When the cell has reached the approximate desired operating temperature, liquid feedstock is passed from separator 18 via conduit 22 into heat exchange means 16 and is therein at least partially vaporized. The resultant feedstock, at least partially vaporized, is passed into separator 18 by means of conduit 20. The latent heat of vaporization gained by said feedstock in heat exchange means 16 serves to remove heat from the electrolyte. The temperature of said electrolyte is sensed by means of sensor 44. The signal from transmitter 46 is passed to TRC 48, which is provided with a setpoint representing desired cell temperature, and a suitable signal therefrom is passed via selector 50 to PRC 42 which actuates control valve 40 to maintain a pressure, which will produce the desired cell temperature, in separator 18 and heat exchange means 16 and thus control the temperature of electrolyte 14 by controlling the rate at which feedstock is vaporized in heat exchange means 16. The vapors released by valve 40 are condensed in condenser 52 and the resulting liquid is returned to said separator 18. Another portion of the vapors from separator 18 is withdrawn via conduit 58, compressed in compressor 60, and the compressed vapors are then introduced into the said inlet conduit 28 as feedstock for the process. When operation of the process has thus been initiated, the vapors introduced initially via conduit 64 can be discontinued, and fresh feedstock introduced, as liquid, via conduits 55 and 56 into separator 18.

While the cell illustrated in the drawing has been simplified by showing one anode means and one cathode means, it will be understood that a plurality of anodes and a plurality of cathodes, disposed in either one container or a plurality of containers, can be employed in the practice of the invention. Also, as will be understood by those skilled in the art in view of this disclosure, the actual operating conditions employed in any particular cell system will depend upon the cell system and the feedstock being supplied thereto. For example, and by way of further illustration of the invention, typical operating conditions for the electrochemical fluorination of 1,2-dichloroethane to 1,2-dichlorotetrafluoroethane using an essentially anhydrous KF·2HF electrolyte include the following: electrolyte temperature, 90 to 100° C.; cell pressure, substantially atmospheric; compressor 60 outlet pressure, 25 to 100 p.s.i.g.; conduit 28 outlet pressure, 1 to 5 p.s.i.g.; and separator 18 pressure, 14.7 to 15 p.s.i.a.

The following example will serve to further illustrate the invention.

EXAMPLE

A run is carried out for the electrochemical fluorination of 1,2-dichloroethane to 1,2-dichlorotetrafluoroethane in a system embodying the essential features of the system illustrated in the drawing. Porous carbon cylinders having cavities in the bottoms thereof are employed as anodes. After operation is initiated using prevaporized feedstock from conduit 64 as described above, 1,2-dichloroethane feedstock vapor and recycle feedstock vapor are introduced via conduit 28, controlled by valve 62, at a rate corresponding to 0.203#/hr./ft.$^2$ of anode geometric area. The conversion is carried out at an electrolyte temperature of 90° C., employing a current of 97,400 amps, a current density of 200 amperes per square foot of anode geometric area, and a voltage of 7 to 9 volts, D.C. Separator 18 is operated at a temperature of 84° C. and a pressure of 14.7 p.s.i.a. Under these conditions the temperature of electrolyte 14 is maintained at 90° C.±2° C. A material balance for the system is set forth in Table I below.

TABLE I

| Stream | Conduit No. | Quantity, lbs./hr. |
|---|---|---|
| Fresh liquid feedstock | 55 | 99 |
| Combined liquid feedstock | 56 | 18,330 |
| Vapor feedstock | 58 | 99 |
| Recycle feedstock | 74 | 540 |
| Total vapor feedstock | 28 | 639 |
| Ht. exchanger inlet | 22 | 20,850 |
| Ht. exchanger effluent | 20 | { [1] 18,330 / [2] 2,520 } |
| Vapor to condenser 52 | 38 | 18,231 |
| 1,2-dichlorotetrafluoroethane | 68 | 171 |
| Hydrogen | 67 | 8 |
| Make-up HF | 11 | 80 |

[1] Vapor.
[2] Liquid.

NOTE.—Heat removed at condenser 52=2,815,000 B.t.u./hr.

While the invention has been described with reference to an electrochemical fluorination system, and particularly an electrochemical fluorination system wherein the reaction is carried out within the pores of a porous anode, the invention is applicable to other types of electrochemical fluorination processes. For example, the invention is applicable to systems wherein the feedstock is passed through the pores of the anode and directly into the main body of the electrolyte. The invention is also applicable to systems wherein the feedstock is dissolved in the electrolyte. The invention is also applicable to other electrochemical conversion processes carried out at either the anode or the cathode, within the pores of the anode or the cathode, by passing the feedstock through the pores of either the anode or the cathode directly into the electrolyte, or by dissolving the feedstock in the electrolyte.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

I claim:
1. A process for the electrochemical conversion of a feedstock at an electrode disposed in an electrolyte in an electrolytic cell, which process comprises: passing a coolant stream of said feedstock into indirect heat exchange relationship with said electrolyte; permitting at least a portion of said coolant stream of feedstock to vaporize during said heat exchange; and passing at least a portion of the resultant feedstock vapors into contact with said electrode.

2. A process according to claim 1 wherein the pressure on said vaporizing coolant stream is controlled in accordance with the temperature of said electrolyte.

3. A process according to claim 2 wherein: the temperature of said electrolyte is measured; and the pressure on said vaporizing coolant stream is controlled by means responsive to said temperature measurement.

4. A process according to claim 1 wherein: said coolant stream of feedstock is withdrawn from said heat exchange relationship and passed to a phase separation zone; another portion of said resultant feedstock vapors is withdrawn from said phase separation zone, passed through a condensing zone, and condensed feedstock is returned to said phase separation zone; the pressure in said phase separation zone is controlled in accordance with the temperature of said electrolyte; and said coolant stream of feedstock is supplied from said phase separation zone.

5. A process in accordance with claim 4 wherein: the temperature of said electrolyte is measured; the pressure in said phase separation zone is controlled by means responsive to said temperature measurement; fresh liquid phase feedstock is passed to said phase separation zone; and said coolant stream of feedstock is supplied from the liquid phase in said phase separation zone.

6. A process according to claim 1 wherein: said electrolysis process comprises a process for the electrochemical fluorination of a fluorinatable feedstock at a porous anode in the presence of a current-conducting essentially anhydrous hydrogen fluoride electrolyte.

7. A process according to claim 6 wherein: said anode is a porous carbon anode; said fluorinatable feedstock is an organic compound; said electrolysis process comprises passing said organic compound into the pores of said anode; and fluorinated product is recovered from an effluent stream from said cell.

8. A process according to claim 7 wherein said feedstock is at least partially flourinated within the pores of said anode.

9. A process according to claim 1 wherein: said electrolysis process comprises a process for the electrochemical fluorination of a fluorinatable organic feedstock in the presence of a current-conducting essentially anhydrous hydrogen fluoride electrolyte; said portion of said resultant feedstock vapors are introduced into the pores of a porous carbon anode and therein are at least partially fluorinated; said coolant stream of feedstock is withdrawn from said heat exchange relationship and passed to a phase separation zone; another portion of said resultant feedstock vapors is withdrawn from said phase separation zone, passed through a condensing zone, and condensed feedstock is returned to said phase separation zone; the temperature of said electrolyte is measured; the pressure in said phase separation zone is controlled by means responsive to said temperature measurement; fresh liquid phase feedstock is passed to said phase separation zone; and said coolant stream of feedstock is supplied from the liquid phase in said phase separation zone.

10. A process according to claim 9 wherein said feedstock is ethylene dichloride.

11. Electrochemical conversion apparatus comprising, in combination: an electrolytic cell; for receiving a body of electrolyte; heat exchange means disposed in said electrolyte; a vapor-liquid separator; first conduit means connecting said heat exchange means and said separator for passing a stream comprising vapors from said heat exchange means to said separator; second conduit means for passing liquid from said separator to said heat exchange means; third conduit means for withdrawing cell products from said cell; fourth conduit means for introducing a feedstock to said cell; fifth conduit means for withdrawing vapor from said separator; pressure control means disposed in said fifth conduit means for controlling the pressure in said separator; temperature sensing means for determining the temperature of said electrolyte; and temperature control means operatively connected to said pressure control means and said temperature sensing means for actuating said pressure control means responsive to the temperature of said electrolyte.

12. Apparatus in accordance with claim 11, comprising, in further combination: a sixth conduit means for passing vapor from said separator into said feedstock inlet conduit means; a compressor disposed in said sixth conduit means; and flow control means disposed in said feedstock inlet conduit means.

References Cited

UNITED STATES PATENTS

| 2,045,832 | 6/1936 | Carter | 204—328X |
| 2,793,991 | 5/1957 | Hutchings | 204—72X |
| 2,831,029 | 4/1958 | Vergilio et al. | 204—59X |
| 3,335,075 | 8/1967 | Borman | 204—72X |

HOWARD S. WILLIAMS, Primary Examiner

N. A. KAPLAN, Assistant Examiner

U.S. Cl. X.R.

204—72, 73, 78, 81, 241, 275, 277